(12) United States Patent
Kinoshita et al.

(10) Patent No.: US 9,273,776 B2
(45) Date of Patent: Mar. 1, 2016

(54) RANGE SWITCHING DEVICE

(71) Applicant: Fuji Jukogyo Kabushiki Kaisha, Tokyo (JP)

(72) Inventors: Takahiro Kinoshita, Tokyo (JP); Koichi Inoue, Tokyo (JP)

(73) Assignee: FUJI JUKOGYO KABUSHIKI KAISHA, Tokyo (JP)

(*) Notice: Subject to any disclaimer, the term of this patent is extended or adjusted under 35 U.S.C. 154(b) by 303 days.

(21) Appl. No.: 13/758,911

(22) Filed: Feb. 4, 2013

(65) Prior Publication Data

US 2013/0220052 A1    Aug. 29, 2013

(30) Foreign Application Priority Data

Feb. 29, 2012 (JP) .................................. 2012-043283

(51) Int. Cl.

| | |
|---|---|
| *F16H 59/08* | (2006.01) |
| *F16H 61/02* | (2006.01) |
| *F16H 61/12* | (2010.01) |
| *F16H 61/66* | (2006.01) |

(52) U.S. Cl.
CPC ............ *F16H 59/08* (2013.01); *F16H 61/0206* (2013.01); *F16H 61/12* (2013.01); *F16H 61/66* (2013.01); *F16H 2061/1224* (2013.01); *F16H 2061/1264* (2013.01); *Y10T 74/20024* (2015.01)

(58) Field of Classification Search
CPC ..... F16H 59/08; F16H 61/0206; F16H 61/12; F16H 61/66; F16H 2061/1224; Y10T 74/19251; Y10T 74/20024
See application file for complete search history.

(56) References Cited

U.S. PATENT DOCUMENTS

| | | | | |
|---|---|---|---|---|
| 5,409,434 A | * | 4/1995 | Furukawa et al. ............. | 477/131 |
| 5,433,124 A | * | 7/1995 | Person ............................. | 74/335 |
| 5,505,674 A | * | 4/1996 | Furukawa et al. ............. | 477/130 |
| 8,435,148 B2 | * | 5/2013 | Moorman ....................... | 475/116 |

FOREIGN PATENT DOCUMENTS

| | | |
|---|---|---|
| JP | 2008-128473 A | 6/2008 |
| JP | 2008-128475 A | 6/2008 |

* cited by examiner

*Primary Examiner* — William C Joyce

(74) *Attorney, Agent, or Firm* — McGinn IP Law Group PLLC

(57) ABSTRACT

A range switching device for performing switching the range of a transmission includes first control valve, a second control valve having a characteristic opposite to the first control, and first, second, third and fourth switching valves for controlling the transmission of oil pressures. The first and second switching valves cooperatively control the transmission of the oil pressure from the first control valve to a forward or reverse driving element (R). The third and fourth switching valve cooperatively control the transmission of the oil pressure from the second control valve to the forward or reverse driving element (R). The third and fourth switching valves each perform a substantially same oil pressure transmission when the state of the second and third actuators is reversed with respect to the first switching and second switching valves, respectively.

12 Claims, 11 Drawing Sheets

RANGE SWITCHING DEVICE

CROSS-REFERENCE TO RELATED APPLICATIONS

The present application claims priority from Japanese Patent Application No. 2012-043283 filed on Feb. 29, 2012, the entire contents of which are hereby incorporated by reference.

BACKGROUND OF THE INVENTION

1. Field of the Invention

The present invention relates to range switching devices that perform switching of drive, reverse, and neutral ranges in an automatic transmission of a vehicle such as an automobile, and more particularly to a range switching device that can switch the ranges even when one or some valves fail.

2. Description of the Related Art

In an automatic transmission such as a CVT or a planetary gear step AT provided in an automobile or the like, the drive, reverse, and neutral ranges are switched by controlling the oil pressure supplied to engagement elements such as a forward clutch and a reverse clutch.

Switching of such drive, reverse, and neutral ranges has conventionally been performed by a manual valve connected by a mechanical linkage to an operation lever operated by the driver.

Recently, there has been proposed a technology so-called shift-by-wire system in which switching of running ranges is performed only by eclectic signals, without providing a mechanical linkage between the operation lever and the transmission.

As an example of a conventional technique relating to shift-by-wire systems of automatic transmission, Japanese Unexamined Patent Application Publication (JP-A) No. 2008-128475 describes a range switching device in which spool valves are actuated by three solenoid valves to switch the oil pressure supplied to drive and reverse hydraulic servos.

Further, JP-A No. 2008-128473 describes a range switching device in which running ranges are switched by two solenoid valves and the running range can be maintained even when either one of the solenoid valves fails in the running range.

However, when one or some of solenoid valves fail, the technique described in JP-A No. 2008-128475 cannot switch the ranges, and thus the vehicle cannot run.

The technique described in JP-A No. 2008-128473 ensures minimal failsafe capability, thereby maintaining the running range during running and switching to the neutral range even when either one of the solenoid valves has failed. However, the neutral range is selected in this state, the range pressure cannot be supplied again, and thus the vehicle cannot run.

SUMMARY OF THE INVENTION

In view of the above, it is an object of the present invention to provide a range switching device that is capable of switching among the drive, reverse, and neutral ranges even when one or some valves fail.

A first aspect of the present invention provides a range switching device that performs switching among a drive range in which an oil pressure is transmitted to a forward driving element (D) of a transmission, a reverse range in which an oil pressure is transmitted to a reverse driving element (R), and a neutral range in which an oil pressure is substantially not transmitted to either one of the forward driving element (D) and the reverse driving element (R). The range switching device includes: a first control valve that is driven by a first actuator and controls an oil pressure transmitted from an oil pressure supply source to a downstream; a first switching valve that is driven by a second actuator and can select an oil channel for transmitting the oil pressure transmitted from the first control valve to the downstream; a second switching valve that is driven by a third actuator and can transmit the oil pressure transmitted from the first switching valve to either one of the forward driving element (D) and the reverse driving element (R); second control valve that is driven by the first actuator and controls the oil pressure from the oil pressure supply source to the downstream so as to deliver a characteristic opposite to that of the first control valve; a third switching valve that is driven by the second actuator and can select an oil channel for transmitting the oil pressure transmitted from the second control valve to the downstream; and a fourth switching valve that is driven by the third actuator and can transmit the oil pressure transmitted from the third switching valve to either one of the forward driving element (D) and the reverse driving element (R). The first switching valve and the second switching valve can cooperatively switch to any one of a state for transmitting the oil pressure transmitted from the first control valve to the forward driving element (D), a state for transmitting the oil pressure to the reverse driving element (R), and a state without transmitting the oil pressure. The third switching valve and the fourth switching valve can cooperatively switch to any one of a state for transmitting the oil pressure transmitted from the second control valve to the forward driving element (D), a state for transmitting the oil pressure to the reverse driving element (R), and a state without transmitting the oil pressure. The third switching valve and the fourth switching valve each perform a substantially same oil pressure transmission when a state of the second actuator and a state of the third actuator are reversed with respect to the first switching valve and the second switching valve, respectively.

With such a configuration, even when one or some of the first to third actuators and the control valves and switching valves driven thereby fail, range switching same as that of a normal state can be performed by switching other normal actuators, control valves and switching valves to a state opposite to the normal state.

Preferably, the first switching valve and the third switching valve can be switched among running ranges including the drive range and the reverse range and the neutral range. The second switching valve and the fourth switching valve can be switched between the drive range and the reverse range.

With such a configuration, since the characteristic of the first switching valve is opposite to that of the third switching valve and the characteristic of the second switching valve is opposite to that of the fourth switching valves, switching among the running ranges and the neutral range and between the drive range and the reverse range can be performed in the same manner as in the normal state even during a failure.

Preferably, at least one of three pairs of the first control valve and the second control valve, the first switching valve and the third switching valve, and the second switching valve and the fourth switching valve is configured as a spool valve having a common spool.

With such a configuration, it is possible to reduce the number of parts, simplify the device configuration, decrease weight, and reduce the size.

DESCRIPTION OF THE PREFERRED EMBODIMENTS

The present invention provides a range switching device that can switch among the drive, reverse, and neutral ranges even when one or some valves fail by forming ports ensuring opposite characteristics in spool valves driven by the respective first to third solenoids and selecting ranges by combinations of logical patterns of the valves.

Embodiment 1

Embodiment 1 of a range switching device according to the present invention is explained below.

The range switching device of Embodiment 1 is provided, for example, at a continuously variable transmission (CVT) that is installed on an automobile such as a passenger car and transmits the output of an engine.

Figure 1:
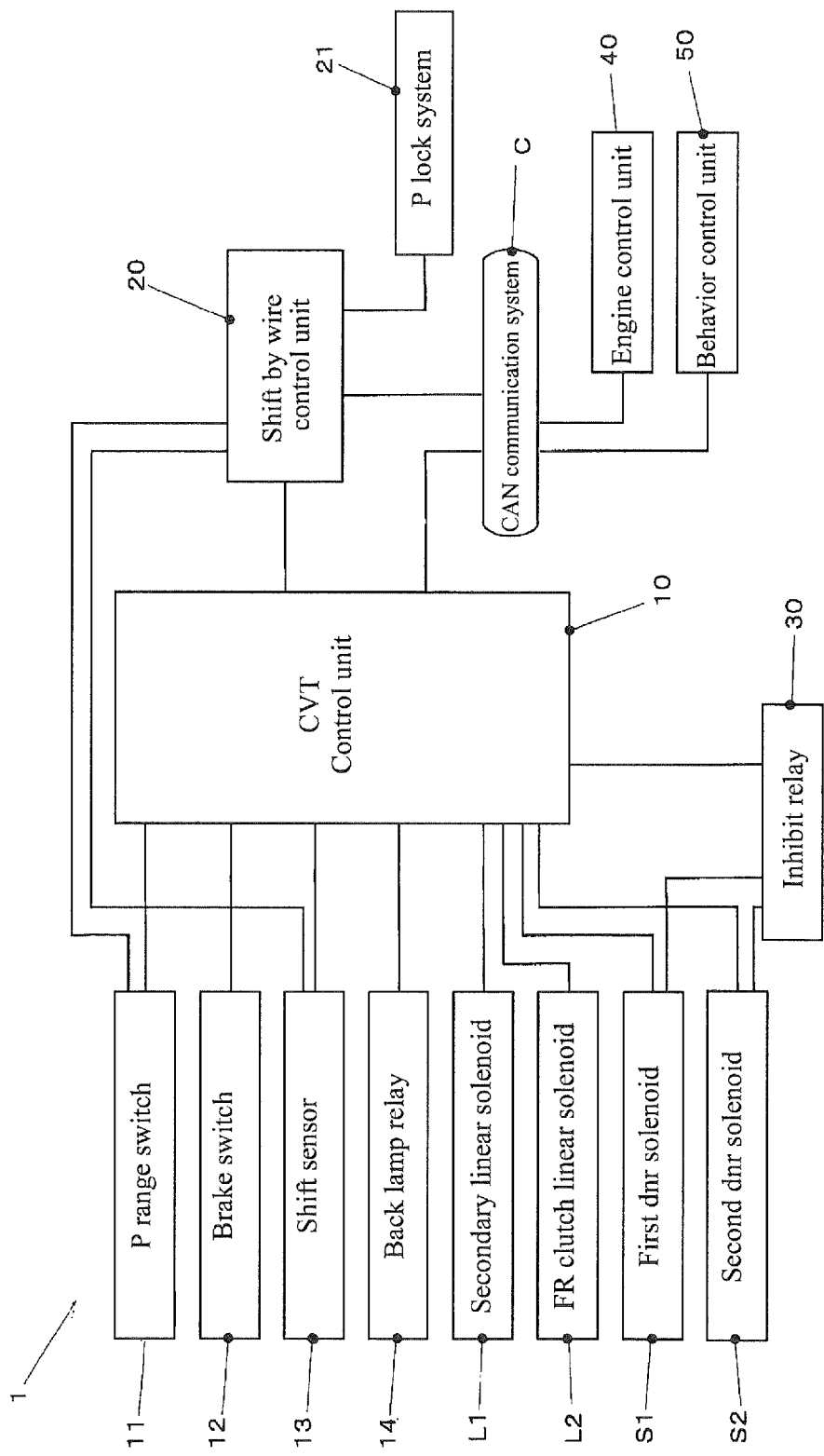
FIG. 1 is a schematic block diagram of a transmission control system including a range switching device of Embodiment 1 according to the present invention.

FIG. 1 is a schematic block diagram of a transmission control system including the range switching device of Embodiment 1.

As shown in FIG. 1, a transmission control system 1 has a CVT control unit 10, a shift-by-wire control unit 20, and an inhibit relay 30. The transmission control system 1 controls a secondary linear solenoid L1, an FR clutch linear solenoid L2, a first DNR solenoid S1, and a second DNR solenoid S2.

The CVT control unit 10 performs integral control of the CVT and auxiliary device thereof. The CVT control unit 10 includes an information processing device such as a CPU, a memory device such as a ROM or a RAM, an input/output interface, and a bus connecting these devices.

The CVT control unit 10 performs the shifting control of the CVT and the control of a lock-up clutch (not shown in the figure).

A P range switch 11, a brake switch 12, a shift sensor 13, and a back lamp relay 14 are connected to the CVT control unit 10.

The P range switch 11 is provided in a shift operation unit (not shown in the figure) that is used by a driver for shifting and serves to detect that the operation of selecting a P range has been performed in the shift operation unit.

The brake switch 12 detects whether or not a brake operation is performed by the driver. The brake switch 12 is turned ON when the driver depresses a brake pedal (not shown in the figure).

The shift sensor 13 detects whether the driver has selected a range such as D (drive), N (neutral), or R (rear) at the shift operation unit.

The back lamp relay 14 lights back lamps on the rear side of the vehicle when the R range is selected.

The outputs of the P range switch 11 and the shift sensor 13 are both also transmitted to the shift-by-wire control unit 20.

The CVT control unit 10 determines the range required by the driver on the basis of the outputs of the P range shift 11 and the shift sensor 13, controls the FR clutch linear solenoid L2, the first DNR solenoid S1, and the second DNR solenoid S2, switches among the D range, N range, and R range, and outputs a switching request relating to a P lock system 21 to the shift-by-wire control unit 20.

The shift-by-wire control unit 20 switches the P lock system 21 to the P range or a state other than the P range on the basis of the switching request output relating to the P lock system 21 from the CVT control unit 10.

The shift-by-wire control unit 20 includes an information processing device such as a CPU, a memory device such as a ROM or a RAM, an input/output interface, and a bus connecting these devices.

The secondary linear solenoid L1 adjusts the oil pressure supplied from an oil pump (not shown in the figure) and supplies the adjusted pressure to the range switching device.

The FR clutch linear solenoid L2, the first DNR solenoid S1, and the second DNR solenoid S2 supply the oil pressure to later-described spool valves 100, 200, and 300 to control these spool valves.

In this embodiment, a linear solenoid is used that adjusts the oil pressure according to an electric current, but the present invention is not limited to such configuration. Alternatively, for example, a duty solenoid may be used that adjusts the oil pressure according to a duty ratio.

The P lock system 21 mechanically locks the rotation of the output shaft of the transmission when the P range is selected, and releases the mechanical lock of the rotation of the output shaft of the transmission when a state other than the P range is selected.

The inhibit relay 30 is provided in a power supply system that supplies power to a starter motor (not shown in the figure). When a range other than the P range and the N range is selected, the inhibit relay inhibits the drive of the starter motor, except for the case of an automatic start of the engine from the idle stop control state.

Further, an engine control unit 40 and a behavior control unit 50 are connected to the CVT control unit 10 and the shift-by-wire control unit 20 through a CAN communication system C, which is a vehicle LAN.

The engine control unit 40 performs the integral control of the engine and the auxiliary device thereof (not shown in the figure).

The behavior control unit 50 performs a vehicle behavior control and an antilock brake control. The vehicle behavior control creates a difference in a brake force between the left and right wheels according to the occurrence of vehicle behavior such as understeering or oversteering, thereby generating a moment in the direction of inhibiting such a behavior.

The hydraulic system of the range switching device of Embodiment 1 is explained below.

Figure 2:
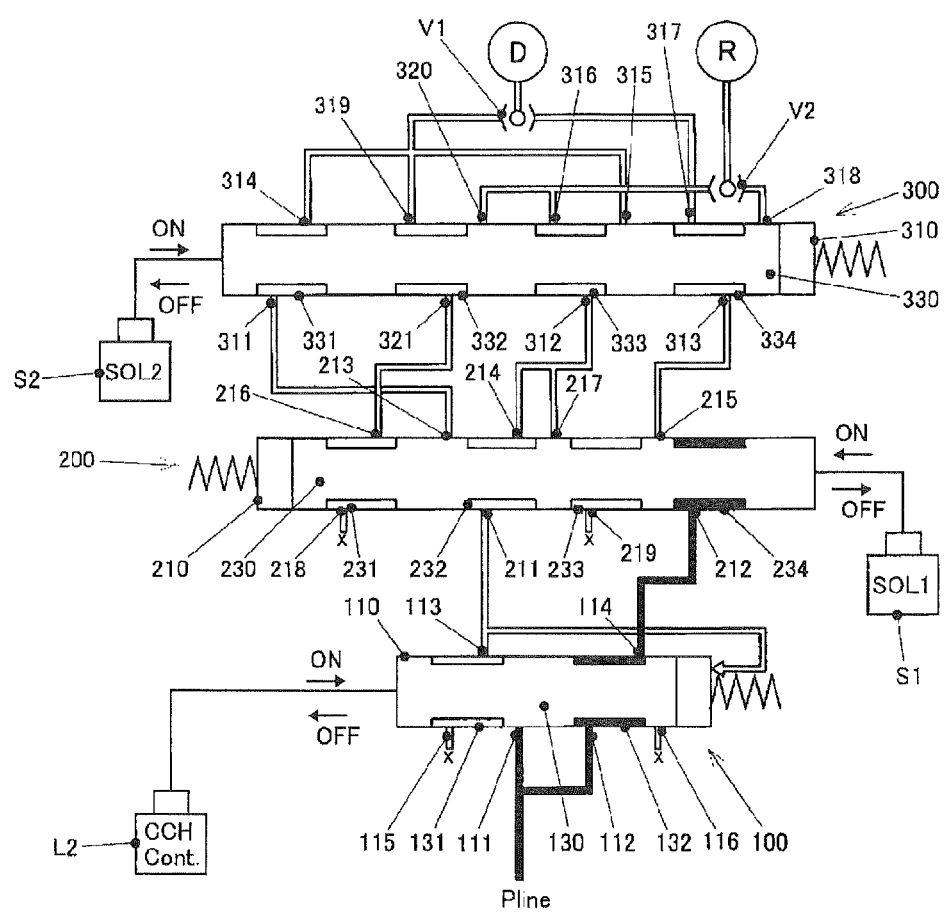
FIG. 2 shows a hydraulic circuit of the range switching device of Embodiment 1 and illustrates a N range in a normal state.

FIG. 2 shows the hydraulic circuit of the range switching device and illustrates the N range in a normal state (no-failure state).

In FIGS. 2 to 11, hydraulic paths in which a high pressure is supplied are shown by bold black lines.

The range switching device switches the supply of oil pressure to a forward clutch D and a reverse clutch R and has the spool valves 100, 200, and 300.

The spool valve 100 is configured by inserting a round rod-like spool 130 into a cylindrical sleeve 110.

The spool 130 is operated by switching the pressure supplied from the FR clutch linear solenoid L2 to one end of the sleeve 110.

Small-diameter portions 131 and 132 constituting the oil channels are formed in the spool 130 in the order of description from one end side thereof.

When the FR clutch linear solenoid L2 is switched ON (a discharge pressure is high), the spool 130 is moved to the right in FIG. 2 by the oil pressure.

When the FR clutch linear solenoid L2 is switched OFF (the discharge pressure is low), the spool 130 is moved to the left in FIG. 2 by a biasing force of a spring.

Ports 111, 112, 113, 114, 115, and 116 are formed in the sleeve 110.

The ports 111 and 112 supply a line pressure into the sleeve 110.

The port 111 communicates with the port 113 via the small-diameter portion 131 when the FR clutch linear solenoid L2 is ON, and is closed when the solenoid is OFF.

The port 112 communicates with the port 114 via the small-diameter portion 132 when the FR clutch linear solenoid L2 is OFF, and is closed when the solenoid is ON.

The ports 113 and 114 supply an oil pressure from the sleeve 110 to the spool valve 200.

Further, the oil pressure line from the port 113 is branched to supply an oil pressure to the end of the sleeve 110 on the opposite side of the FR clutch linear solenoid L2, whereby the oil pressure applied to the ports 113 and 114 can be continuously controlled according to the electric current flowing in the FR clutch linear solenoid L2.

The ports 113 and 114 communicate respectively with the small-diameter portions 131 and 132 of the spool 130, regardless of whether the FR clutch linear solenoid L2 is ON or OFF.

The ports 115 and 116 drain the oil pressure from the sleeve 110.

The port 115 is closed when the FR clutch linear solenoid L2 is ON, and communicates with the small-diameter portion 131 of the spool 130 when the solenoid is OFF.

The port 116 is closed when the FR clutch linear solenoid L2 is OFF, and communicates with the small-diameter portion 132 of the spool 130 when the solenoid is ON.

In the spool valve 100, a portion receiving the supply of oil pressure from the port 111 functions as the first control valve according to the present invention, and a portion receiving the supply of oil pressure from the port 112 functions as the second control valve according to the present invention.

The spool valve 200 is configured by inserting a round rod-shaped spool 230 into the cylindrical sleeve 210.

In a normal state, the spool valve 200 mainly performs the selection from running ranges including the D range and the R range, and the N range.

The spool 230 is driven by switching the pressure supplied from the first DNR solenoid S1 to one end of the sleeve 210.

Small-diameter portions 231, 232, 233, and 234 constituting the oil channels are formed in the spool 230 in the order of description from one end side thereof.

When the first DNR solenoid S1 is switched ON (the discharge pressure is high), the spool 230 is moved by the oil pressure to the left in FIG. 2.

Where the first DNR solenoid S1 is switched OFF (the discharge pressure is low), the spool 230 is moved by the biasing force of a spring to the right in FIG. 2.

Ports 211, 212, 213, 214, 215, 216, 217, 218, and 219 are formed in the sleeve 210.

The ports 211 and 212 introduce an oil pressure supplied from the spool valve 100 into the sleeve 210.

The port 211 communicates with the port 113, and also communicates with the small-diameter portion 232 of the spool 230, regardless of whether the first DNR solenoid S1 is ON or OFF.

The port 212 communicates with the port 114, and also communicates with the small-diameter portion 234 of the spool 230, regardless of whether the first DNR solenoid S1 is ON or OFF.

The port 213 supplies the oil pressure introduced from the port 113 via the port 211 and the small-diameter portion 232 to the spool valve 300.

The port 213 communicates with the port 211 via the small-diameter portion 232 when the first DNR solenoid S1 is ON, and is closed when the solenoid is OFF.

The port 214 supplies the oil pressure introduced from the port 113 via the port 211 and the small-diameter portion 232 to the spool valve 300.

The port 214 communicates with the port 211 via the small-diameter portion 232 when the first DNR solenoid S1 is OFF, and is closed when the solenoid is ON.

The port 215 supplies the oil pressure introduced from the port 114 via the port 212 and the small-diameter portion 234 to the spool valve 300.

The port 215 communicates with the port 212 via the small-diameter portion 234 when the first DNR solenoid S1 is ON, and is closed when the solenoid is OFF.

The port 216 drains the oil pressure returned from the port 321 of the spool valve 300 from the port 218 via the small-diameter portion 231 when the oil pressure is unnecessary.

The port 216 communicates with the small-diameter portion 231 when the first DNR solenoid S1 is OFF, and is closed when the solenoid is ON.

The port 217 communicates with the oil channel leading from the port 214 to the spool valve 300, and drains the oil pressure supplied from the port 214 from the port 219 via the small-diameter portion 233 when the oil pressure is unnecessary.

The port 217 communicates with the small-diameter portion 233 when the first DNR solenoid S1 is ON, and is closed when the solenoid is OFF.

The ports 218 and 219 drain the oil pressure from the small-diameter portions 231 and 233 respectively.

The ports 218 and 219 communicate with the small-diameter portions 231 and 233 respectively, regardless of whether the first DNR solenoid S1 is ON or OFF.

In the spool valve 200, a portion receiving the supply of oil pressure from the port 113 functions as the first switching valve according to the present invention, and a portion receiving the supply of oil pressure from the port 114 functions as the third switching valve according to the present invention.

The spool valve 300 is configured by inserting a round rod-shaped spool 330 into the cylindrical sleeve 310.

In a normal state, the spool valve 300 mainly performs switching between the D range and the R range.

The spool 330 is driven by switching the pressure supplied from the second DNR solenoid S2 to one end of the sleeve 310.

Small-diameter portions 331, 332, 333, and 334 constituting the oil channels are formed in the spool 330 in the order of description from one end side thereof.

When the second DNR solenoid S2 is switched ON (the discharge pressure is high), the spool 330 is moved by the oil pressure to the right in FIG. 2.

When the second DNR solenoid S2 is switched OFF (the discharge pressure is low), the spool 330 is moved by the biasing force of a spring to the left in FIG. 2.

Ports 311, 312, 313, 314, 315, 316, 317, 318, 319, 320, and 321 are formed in the sleeve 310.

The port 311 introduces the oil pressure supplied from the port 213 into the sleeve 310.

The port 311 communicates with the small-diameter portion 331 when the second DNR solenoid S2 is OFF, and is closed when the solenoid is ON.

The port 312 introduces the oil pressure supplied from the port 214 into the sleeve 310.

The port 312 communicates with the small-diameter portion 333 regardless of whether the second DNR solenoid S2 is ON or OFF.

The port 313 introduces the oil pressure supplied from the port 215 into the sleeve 310.

The port 313 communicates with the small-diameter portion 334 regardless of whether the second DNR solenoid S2 is ON or OFF.

The port 314 supplies the oil pressure introduced from the port 311 via the small-diameter portion 331 to the forward clutch D.

The port 314 communicates with the small-diameter portion 331 regardless of whether the second DNR solenoid S2 is ON or OFF.

The port 315 supplies the oil pressure introduced from the port 312 via the small-diameter portion 333 to the forward clutch D.

The port 315 communicates with the small-diameter portion 333 when the second DNR solenoid S2 is ON, and is closed when the solenoid is OFF.

The oil channels from the ports 314 and 315 merge and are connected through a shuttle valve V1 to the forward clutch D.

The port 316 supplies the oil pressure introduced from the port 312 via the small-diameter portion 333 to the reverse clutch R.

The port 316 communicates with the small-diameter portion 333 when the second DNR solenoid S2 is OFF, and is closed when the solenoid is ON.

The port 317 supplies the oil pressure introduced from the port 313 via the small-diameter portion 334 to the forward clutch D.

The port 317 communicates with the small-diameter portion 334 when the second DNR solenoid S2 is OFF, and is closed when the solenoid is ON.

The port 318 supplies the oil pressure introduced from the port 313 via the small-diameter portion 334 to the reverse clutch R.

The port 318 communicates with the small-diameter portion 334 when the second DNR solenoid S2 is ON, and is closed when the solenoid is OFF.

The port 319 communicates with the oil channels from the ports 314 and 315 and drains the oil pressure through the small-diameter portion 332, port 321, port 216, and small-diameter portion 231 from the port 218 when the oil pressure is unnecessary.

The port 319 communicates with the small-diameter portion 332 when the second DNR solenoid S2 is OFF, and is closed when the solenoid is ON.

The port 320 communicates with the oil channel from the port 316 and drains the oil pressure through the small-diameter portion 332, port 321, port 216, and small-diameter portion 231 from the port 218 when the oil pressure is unnecessary.

The port 320 communicates with the small-diameter portion 332 when the second DNR solenoid S2 is ON, and is closed when the solenoid is OFF.

The port 321 communicates with the port 216 and also communicates with the small-diameter portion 332, regardless of whether the second DNR solenoid S2 is ON or OFF.

In the spool valve 300, a portion receiving the supply of oil pressure from the port 113 through the spool valve 200 functions as the second switching valve according to the present invention, and the portion receiving the supply of oil pressure from the port 114 through the spool valve 200 functions as the fourth switching valve according to the present invention.

The shuttle valve V1 is provided on the inlet side of the forward clutch D.

The shuttle valve V1 has two inlets and communicates one thereof which is at a relatively high pressure side with the forward clutch D.

One inlet of the shuttle valve V1 communicates with the ports 314, 315, and 319.

The other inlet of the shuttle valve V1 communicates with the port 317.

A shuttle valve V2 is provided on the inlet side of the reverse clutch R.

The shuttle valve V2 has two inlets and communicates one thereof which is at a relatively high pressure side with the reverse clutch R.

One inlet of the shuttle valve V2 communicates with the ports 316 and 320.

The other inlet of the shuttle valve V2 communicates with the port 318.

In the case of a vehicle equipped with an idle stop system that stops the engine when the vehicle is stopped, the biasing force of the spring in each spool valve is preferably set such that the running range can be maintained by the discharge pressure of the electric pump.

The operation of the above-described range switching device is explained below.

<N Range in Normal State>

In a normal state shown in FIG. 2 and in an N range, the FR clutch linear solenoid L2 is OFF, the first DNR solenoid S1 is OFF, and the second DNR solenoid S2 is OFF.

As a result, the line pressure reaches the small-diameter portion 234 through the port 112, small-diameter portion 132, and ports 114 and 212, in the order of description. Since the port 215 is closed, the line pressure is not supplied to the forward clutch D or the reverse clutch R.

Figure 3:
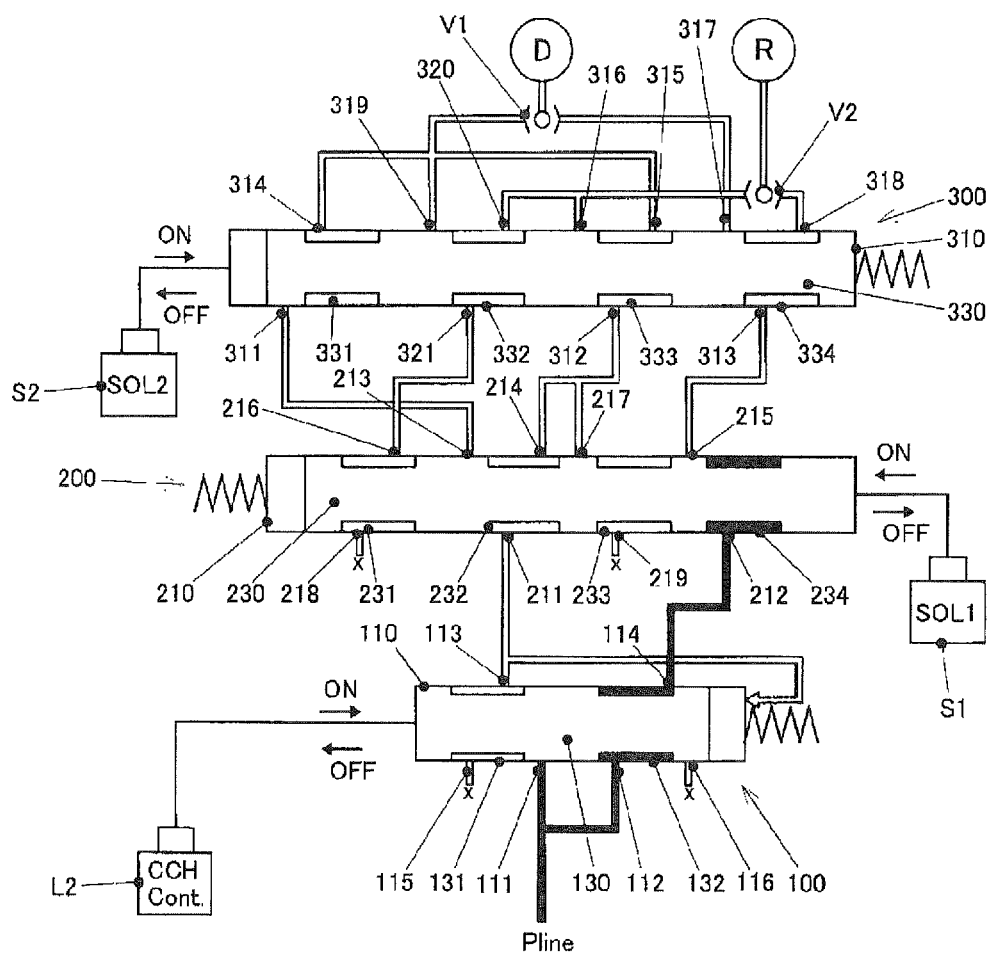
FIG. 3 shows the hydraulic circuit of the range switching device shown in FIG. 2 and illustrates another example of the N range in a normal state.

The N range can be also selected in the state shown in FIG. 3, instead of the state shown in FIG. 2.

FIG. 3 shows a hydraulic circuit of the range switching device of Embodiment 1 and illustrates another example of the N range in a normal state.

In the state shown in FIG. 3, the second DNR solenoid S2 is ON and the spool 330 of the spool valve 300 moves to the right. In this case, however, the line pressure also reaches only the small-diameter portion 234, as in the case illustrated by FIG. 2, and therefore the line pressure is not supplied to the forward clutch D or the reverse clutch R.

<D Range in Normal State>

Figure 4:
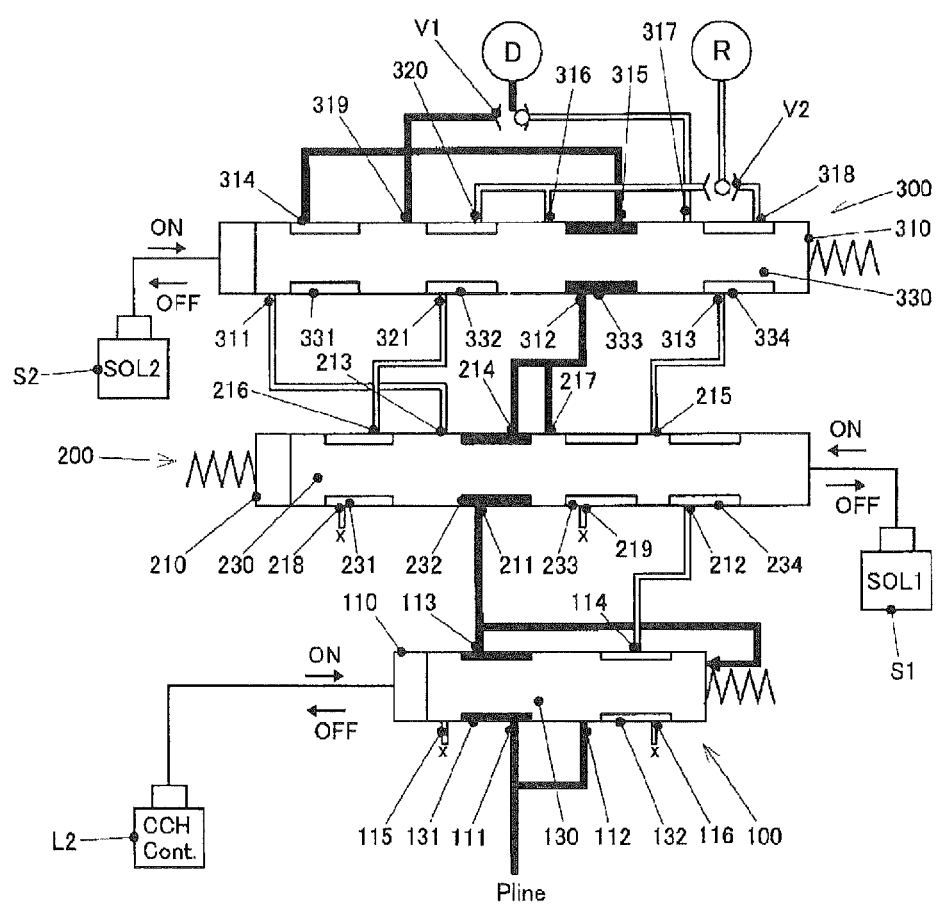
FIG. 4 shows the hydraulic circuit of the range switching device shown in FIG. 2 and illustrates a D range in a normal state.

FIG. 4 shows the hydraulic circuit of the range switching device of Embodiment 1 and illustrates the D range in a normal state.

In the state shown in FIG. 4, the FR clutch linear solenoid L2 is ON, the first DNR solenoid S1 is OFF, and the second DNR solenoid S2 is ON.

As a result, the line pressure is supplied to the forward clutch D through the port 111, small-diameter portion 131, port 113, port 211, small-diameter portion 232, port 214, port 312, small-diameter portion 333, port 315, and shuttle valve V1 in the order of description.

<R Range in Normal State>

Figure 5:
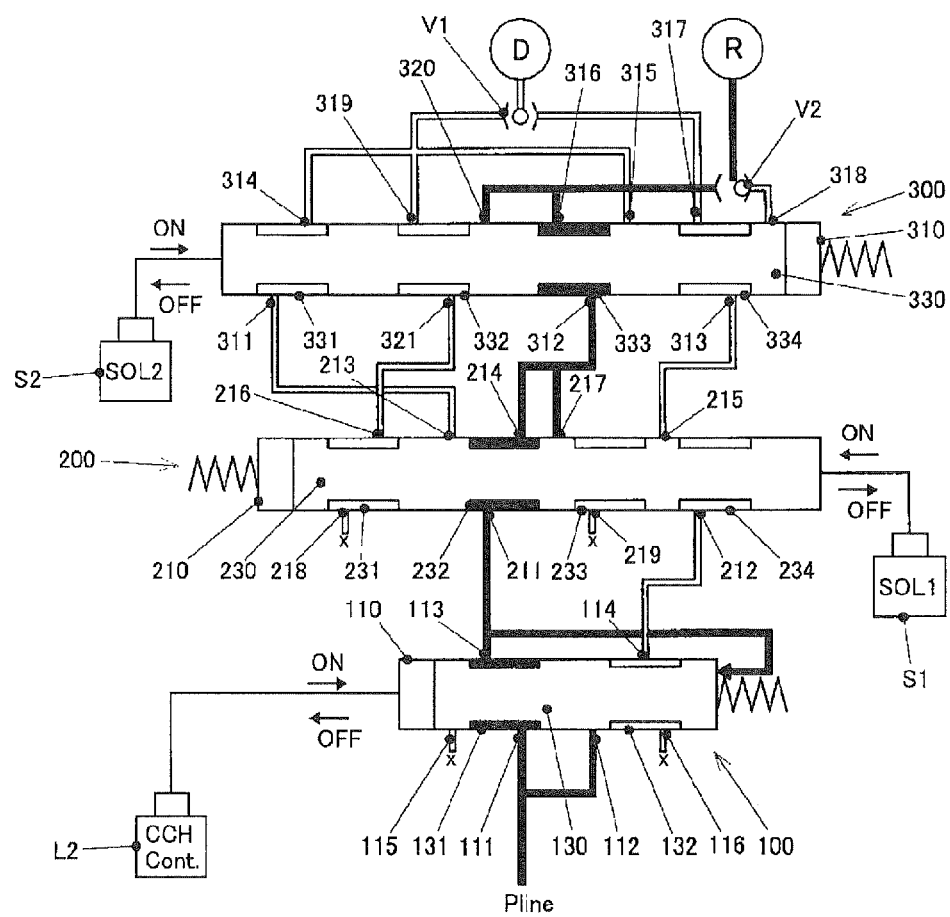
FIG. 5 shows the hydraulic circuit of the range switching device shown in FIG. 2 and illustrates an R range in a normal state.

FIG. 5 shows the hydraulic circuit of the range switching device of Embodiment 1 and illustrates the R range in a normal state.

In the state shown in FIG. 5, the FR clutch linear solenoid L2 is ON, the first DNR solenoid S1 is OFF, and the second DNR solenoid S2 is OFF.

As a result, the line pressure is supplied to the reverse clutch R through the port 111, small-diameter portion 131, port 113, port 211, small-diameter portion 232, port 214, port 312, small-diameter portion 333, port 316, and shuttle valve V2 in the order of description.

The range switching performed when a failure occurs in which the FR clutch linear solenoid L2 is fixed in the ON state is explained below.

<N Range During ON Failure of FR Clutch Linear Solenoid>

Figure 6:
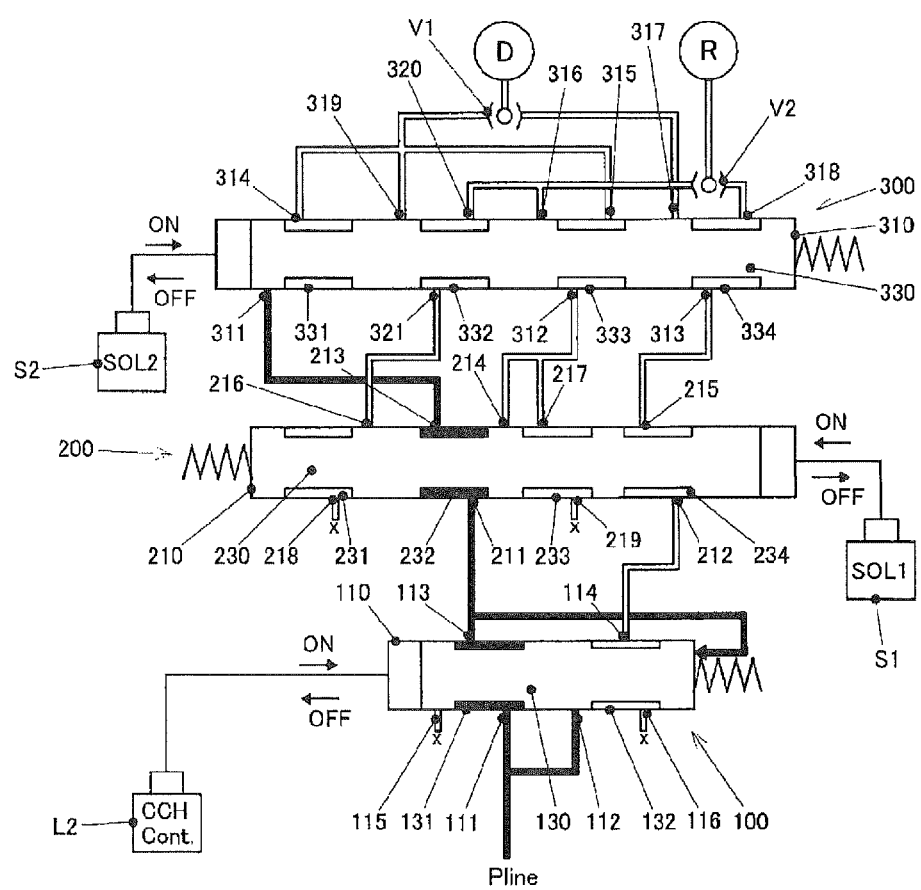
FIG. 6 shows the hydraulic circuit of the range switching device shown in FIG. 2 and illustrates the state of the N range during the ON failure of an FR clutch linear solenoid.

FIG. 6 shows the hydraulic circuit of the range switching device of Embodiment 1 and illustrates the state of the N range during an ON failure of the FR clutch linear solenoid.

In the state shown in FIG. 6, the FR clutch linear solenoid L2 is ON, the first DNR solenoid S1 is ON, and the second DNR solenoid S2 is ON.

As a result, the line pressure reaches the port 311 through the port 111, small-diameter portion 131, port 113, port 211, small-diameter portion 232, and port 213 in the order of description. However, since the port 311 is closed, the line pressure is not supplied to the forward clutch D or the reverse clutch R.

<D Range During ON Failure of FR Clutch Linear Solenoid>

Similarly to the state shown in FIG. 4 described hereinabove, the FR clutch linear solenoid L2 is ON, the first DNR solenoid S1 is OFF, and the second DNR solenoid S2 is ON.

As a result, the line pressure is supplied to the forward clutch D through the port 111, small-diameter portion 131, port 113, port 211, small-diameter portion 232, port 214, port 312, small-diameter portion 333, port 315, and shuttle valve V1 in the order of description.

<R Range During ON Failure of FR Clutch Linear Solenoid>

Similarly to the state shown in FIG. 5 described hereinabove, the FR clutch linear solenoid L2 is ON, the first DNR solenoid S1 is OFF, and the second DNR solenoid S2 is OFF.

As a result, the line pressure is supplied to the reverse clutch R through the port 111, small-diameter portion 131, port 113, port 211, small-diameter portion 232, port 214, port 312, small-diameter portion 333, port 316, and shuttle valve V2 in the order of description.

The range switching performed when a failure occurs in which the FR clutch linear solenoid L2 is fixed in the OFF state is explained below.

<N Range During OFF Failure of FR Clutch Linear Solenoid>

Similarly to the state shown in FIG. 2 described hereinabove, the FR clutch linear solenoid L2 is OFF, the first DNR solenoid S1 is OFF, and the second DNR solenoid S2 is OFF.

As a result, the line pressure reaches the small-diameter portion 234 through the port 112, small-diameter portion 132, port 114, and port 212. However, since the port 215 is closed, the line pressure is not supplied to the forward clutch D or the reverse clutch R.

<D Range During OFF Failure of FR Clutch Linear Solenoid>

Figure 7:
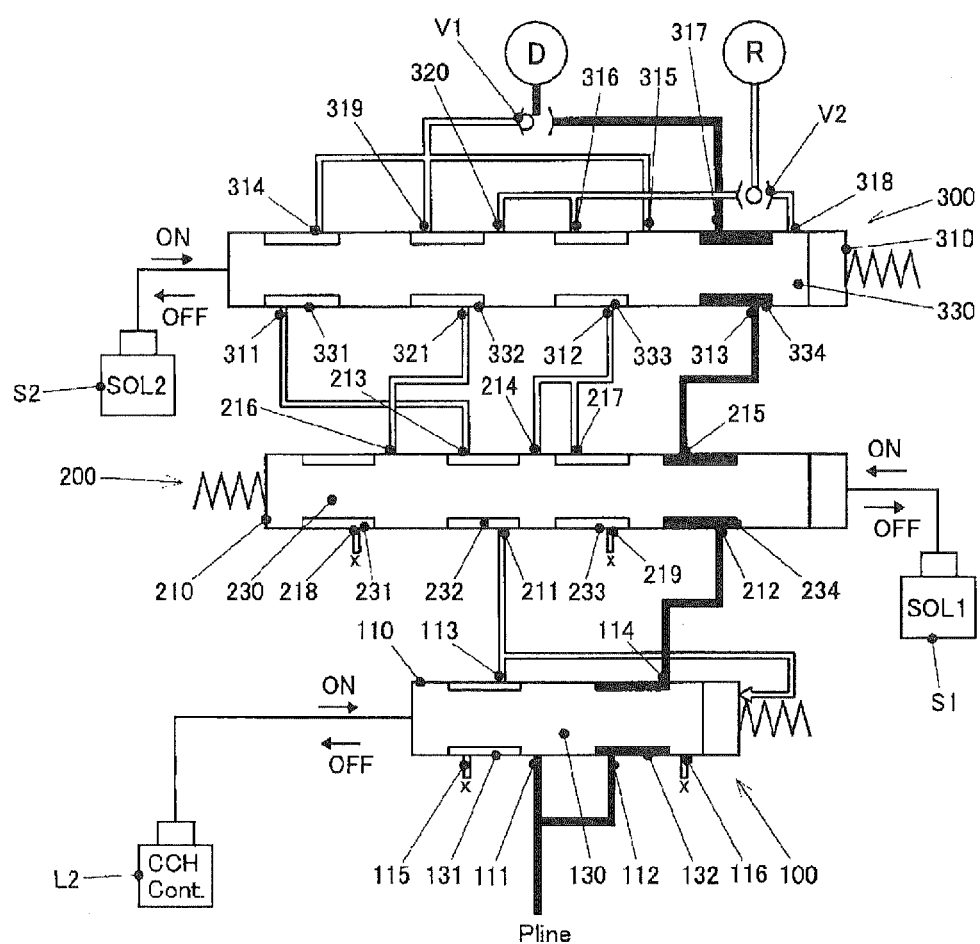
FIG. 7 shows the hydraulic circuit of the range switching device shown in FIG. 2 and illustrates the state of the D range during the OFF failure of the FR clutch linear solenoid.

FIG. 7 shows the hydraulic circuit of the range switching device of Embodiment 1 and illustrates the state of the D range during the OFF failure of the FR clutch linear solenoid.

In the state shown in FIG. 7, the FR clutch linear solenoid L2 is OFF, the first DNR solenoid S1 is ON, and the second DNR solenoid S2 is OFF.

As a result, the line pressure is supplied to the forward clutch D through the port 112, small-diameter portion 132, port 114, port 212, small-diameter portion 234, port 215, port 313, small-diameter portion 334, port 317, and shuttle valve V1 in the order of description.

<R Range During OFF Failure of FR Clutch Linear Solenoid>

Figure 8:
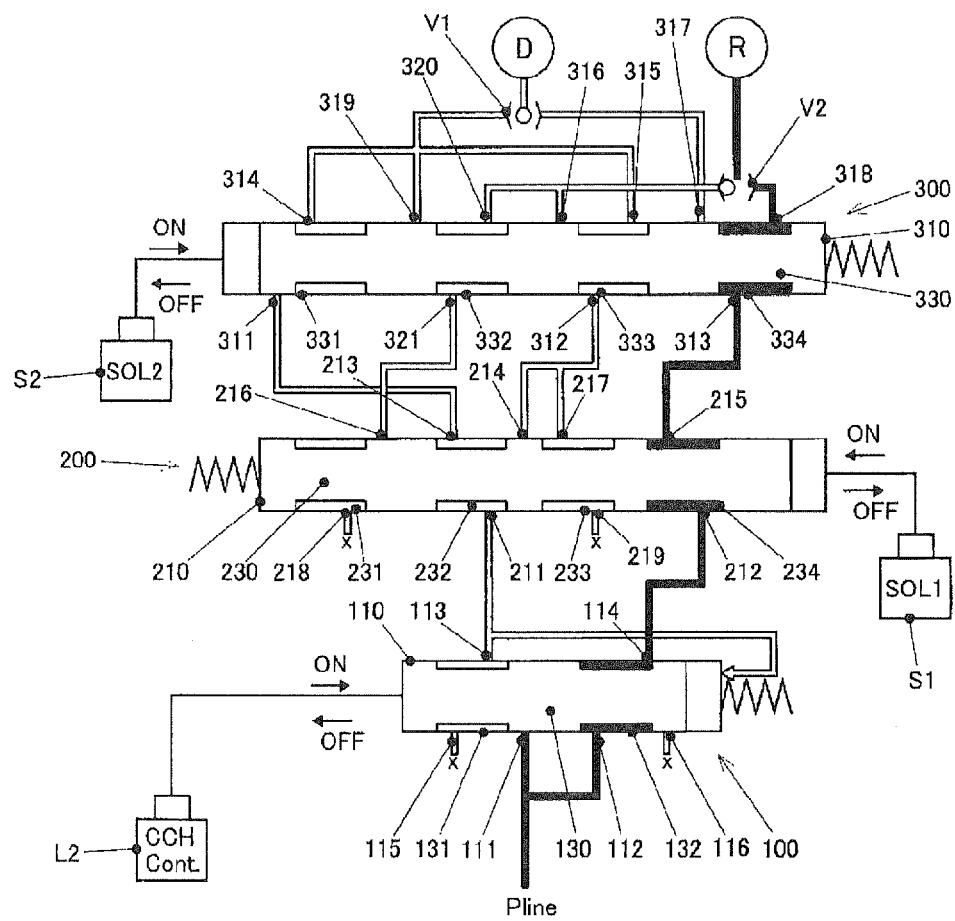
FIG. 8 shows the hydraulic circuit of the range switching device shown in FIG. 2 and illustrates the state of the R range during the OFF failure of the FR clutch linear solenoid.

FIG. 8 shows the hydraulic circuit of the range switching device of Embodiment 1 and illustrates the state of the R range during the OFF failure of the FR clutch linear solenoid.

In the state shown in FIG. 8, the FR clutch linear solenoid L2 is OFF, the first DNR solenoid S1 is ON, and the second DNR solenoid S2 is ON.

As a result, the line pressure is supplied to the reverse clutch R through the port 112, small-diameter portion 132, port 114, port 212, small-diameter portion 234, port 215, port 313, small-diameter portion 334, port 318, and shuttle valve V2 in the order of description.

The range switching performed when a failure occurs in which the first DNR solenoid S1 is fixed in the ON state is explained below.

<N Range During ON Failure of First DNR Solenoid>

Similarly to the state shown in FIG. 6 described hereinabove, the FR clutch linear solenoid L2 is ON, the first DNR solenoid S1 is ON, and the second DNR solenoid S2 is ON.

As a result, the line pressure reaches the port 311 through the port 111, small-diameter portion 131, port 113, port 211, small-diameter portion 232, and port 213 in the order of description. However, since the port 311 is closed, the line pressure is not supplied to the forward clutch D or the reverse clutch R.

<D Range During ON Failure of First DNR Solenoid>

Figure 9:
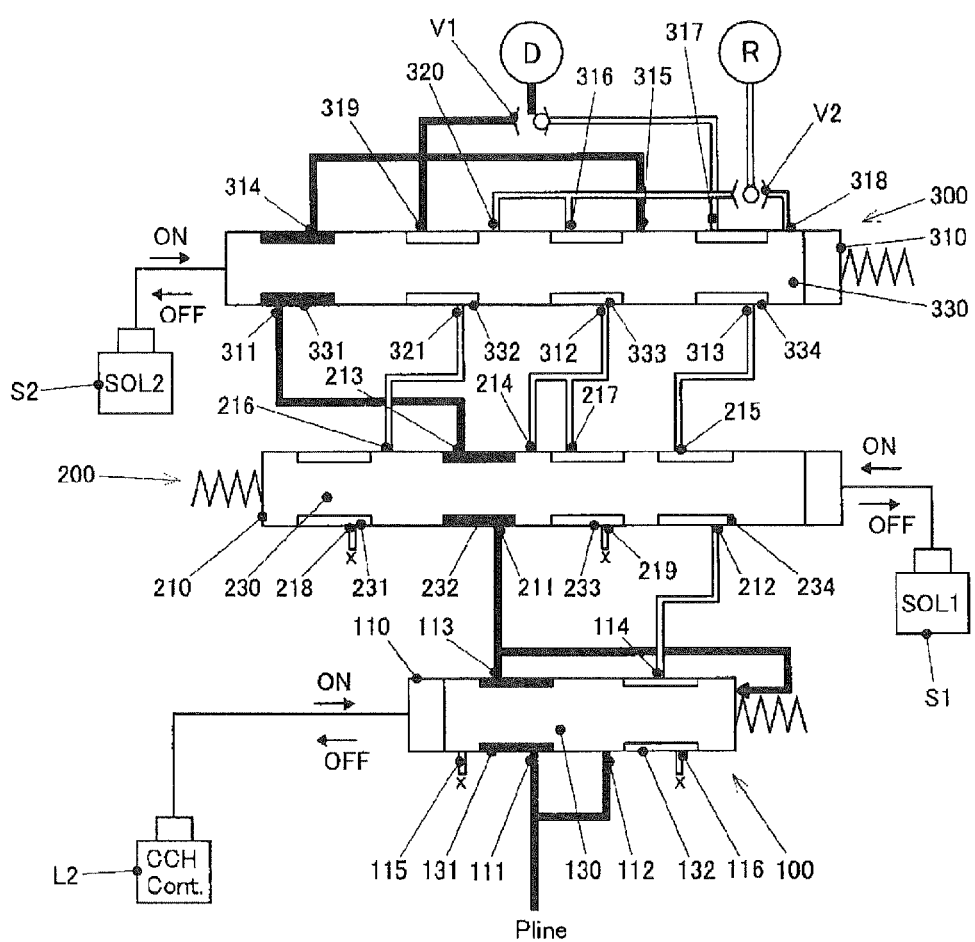
FIG. 9 shows the hydraulic circuit of the range switching device shown in FIG. 2 and illustrates the state of the D range during the ON failure of a first DNR solenoid.

FIG. 9 shows the hydraulic circuit of the range switching device of Embodiment 1 and illustrates the state of the D range during the ON failure of the first DNR solenoid.

In the state shown in FIG. 9, the FR clutch linear solenoid L2 is ON, the first DNR solenoid S1 is ON, and the second DNR solenoid S2 is OFF.

As a result, the line pressure is supplied to the forward clutch D through the port 111, small-diameter portion 131, port 113, port 211, small-diameter portion 232, port 213, port 311, small-diameter portion 331, port 314, and shuttle valve V1 in the order of description.

<R Range During ON Failure of First DNR Solenoid>

Similarly to the state shown in FIG. 8 described hereinabove, the FR clutch linear solenoid L2 is OFF, the first DNR solenoid S1 is ON, and the second DNR solenoid S2 is ON.

As a result, the line pressure is supplied to the reverse clutch R through the port 112, small-diameter portion 132, port 114, port 212, small-diameter portion 234, port 215, port 313, small-diameter portion 334, port 318, and shuttle valve V2 in the order of description.

The range switching performed when a failure occurs in which the first DNR solenoid S1 is fixed in the OFF state is explained below.

<N Range During OFF Failure of First DNR Solenoid>

Similarly to the state shown in FIG. 2 described hereinabove, the FR clutch linear solenoid L2 is OFF, the first DNR solenoid S1 is OFF, and the second DNR solenoid S2 is OFF.

As a result, the line pressure reaches the small-diameter portion 234 through the port 112, small-diameter portion 132, and ports 114 and 212. However, since the port 215 is closed, the line pressure is not supplied to the forward clutch D or the reverse clutch R.

<D Range During OFF Failure of First DNR Solenoid>

Similarly to the state shown in FIG. 4 described hereinabove, the FR clutch linear solenoid L2 is ON, the first DNR solenoid S1 is OFF, and the second DNR solenoid S2 is ON.

As a result, the line pressure is supplied to the forward clutch D through the port 111, small-diameter portion 131, port 113, port 211, small-diameter portion 232, port 214, port 312, small-diameter portion 333, port 315, and shuttle valve V1 in the order of description.

<R Range During OFF Failure of First DNR Solenoid>

Similarly to the state shown in FIG. 5 described hereinabove, the FR clutch linear solenoid L2 is ON, the first DNR solenoid S1 is OFF, and the second DNR solenoid S2 is OFF.

As a result, the line pressure is supplied to the reverse clutch R through the port 111, small-diameter portion 131, port 113, port 211, small-diameter portion 232, port 214, port 312, small-diameter portion 333, port 316, and shuttle valve V2 in the order of description.

The range switching performed when a failure occurs in which the second DNR solenoid S2 is fixed in the ON state is explained below.

<N Range During ON Failure of Second DNR Solenoid>

Similarly to the state shown in FIG. 6 described hereinabove, the FR clutch linear solenoid L2 is ON, the first DNR solenoid S1 is ON, and the second DNR solenoid S2 is ON.

As a result, the line pressure reaches the port 311 through the port 111, small-diameter portion 131, port 113, port 211, small-diameter portion 232, and port 213 in the order of description. However, since the port 311 is closed, the line pressure is not supplied to the forward clutch D or the reverse clutch R.

<D Range During ON Failure of Second DNR Solenoid>

Similarly to the state shown in FIG. 4 described hereinabove, the FR clutch linear solenoid L2 is ON, the first DNR solenoid S1 is OFF, and the second DNR solenoid S2 is ON.

As a result, the line pressure is supplied to the forward clutch D through the port 111, small-diameter portion 131, port 113, port 211, small-diameter portion 232, port 214, port 312, small-diameter portion 333, port 315, and shuttle valve V1 in the order of description.

<R Range During ON Failure of Second DNR Solenoid>

Similarly to the state shown in FIG. 8 described hereinabove, the FR clutch linear solenoid L2 is OFF, the first DNR solenoid S1 is ON, and the second DNR solenoid S2 is ON.

As a result, the line pressure is supplied to the reverse clutch R through the port 112, small-diameter portion 132, port 114, port 212, small-diameter portion 234, port 215, port 313, small-diameter portion 334, port 318, and shuttle valve V2 in the order of description.

The range switching performed when a failure occurs in which the second DNR solenoid S2 is fixed in the OFF state is explained below.

<N Range During OFF Failure of Second DNR Solenoid>

Similarly to the state shown in FIG. 2 described hereinabove, the FR clutch linear solenoid L2 is OFF, the first DNR solenoid S1 is OFF, and the second DNR solenoid S2 is OFF.

As a result, the line pressure reaches the small-diameter portion 234 through the port 112, small-diameter portion 132, and ports 114 and 212. However, since the port 215 is closed, the line pressure is not supplied to the forward clutch D or the reverse clutch R.

<D Range During OFF Failure of Second DNR Solenoid>

Similarly to the state shown in FIG. 9 described hereinabove, the FR clutch linear solenoid L2 is ON, the first DNR solenoid S1 is ON, and the second DNR solenoid S2 is OFF.

As a result, the line pressure is supplied to the forward clutch D through the port 111, small-diameter portion 131, port 113, port 211, small-diameter portion 232, port 213, port 311, small-diameter portion 331, port 314, and shuttle valve V1 in the order of description.

<R Range During OFF Failure of Second DNR Solenoid>

Similarly to the state shown in FIG. 5 described hereinabove, the FR clutch linear solenoid L2 is ON, the first DNR solenoid S1 is OFF, and the second DNR solenoid S2 is OFF.

As a result, the line pressure is supplied to the reverse clutch R through the port 111, small-diameter portion 131, port 113, port 211, small-diameter portion 232, port 214, port 312, small-diameter portion 333, port 316, and shuttle valve V2 in the order of description.

The relationship between each of the above-described solenoid states and the range to be selected is presented in Table 1 below.

TABLE 1

| FR clutch linear solenoid | First DNR solenoid | Second DNR solenoid | Range |
|---|---|---|---|
| OFF | ON | OFF | D |
|  |  | ON | R |
|  | OFF | OFF | N |
|  |  | ON | N |
| ON | ON | OFF | D |
|  |  | ON | N |
|  | OFF | OFF | R |
|  |  | ON | D |

As described hereinabove, the range switching device of Embodiment 1 can switch among the D range, N range, and R range and maintain the running capacity of the vehicle even when any one of the FR clutch linear solenoid L2, first DNR solenoid S1, and second DNR solenoid S2 or any one of the spool valves 100, 200, and 300 fails.

Embodiment 2

Embodiment 2 of the range switching device according to the present invention is described below.

In Embodiments 2 and 3, the components substantially identical to those of the preceding embodiment are assigned with the same reference numerals and the explanation thereof is herein omitted. Thus, mainly the differences among the embodiments are explained.

Figure 10:
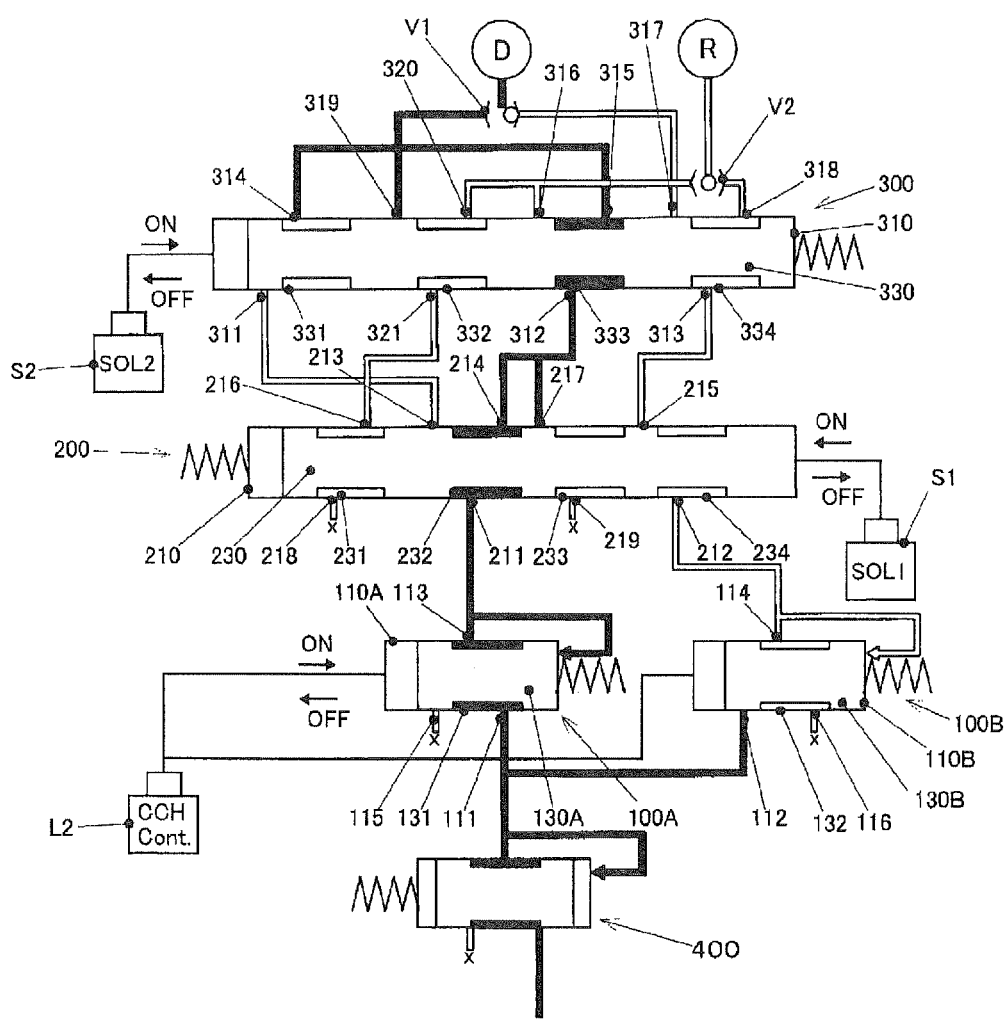
FIG. 10 is a schematic block diagram of a transmission control system including a range switching device of Embodiment 2 according to the present invention.

FIG. 10 shows a hydraulic circuit of the range switching device of Embodiment 2 and illustrates the D range in a normal state.

In the range switching device of Embodiment 2, the spool valve 100 of Embodiment 1 is divided into below-described spool valves 100A and 100B. The spool valves 100A and 100B are together driven by the FR clutch linear solenoid L2.

A sleeve 110A of the spool valve 100A is provided with ports 111, 113, and 115.

A spool 130A inserted into the sleeve 110A is provided with a small-diameter portion 131.

A sleeve 110B of the spool valve 100B is provided with ports 112, 114, and 116.

A line pressure is supplied to each of the ports 111 and 112 from a common modulator valve 400.

A spool 130B inserted into the sleeve 110B is provided with a small-diameter portion 132.

Embodiment 2 can achieve an effect substantially identical to that of the above-described Embodiment 1.

Embodiment 3

Embodiment 3 of the range switching device according to the present invention is explained below.

Figure 11:
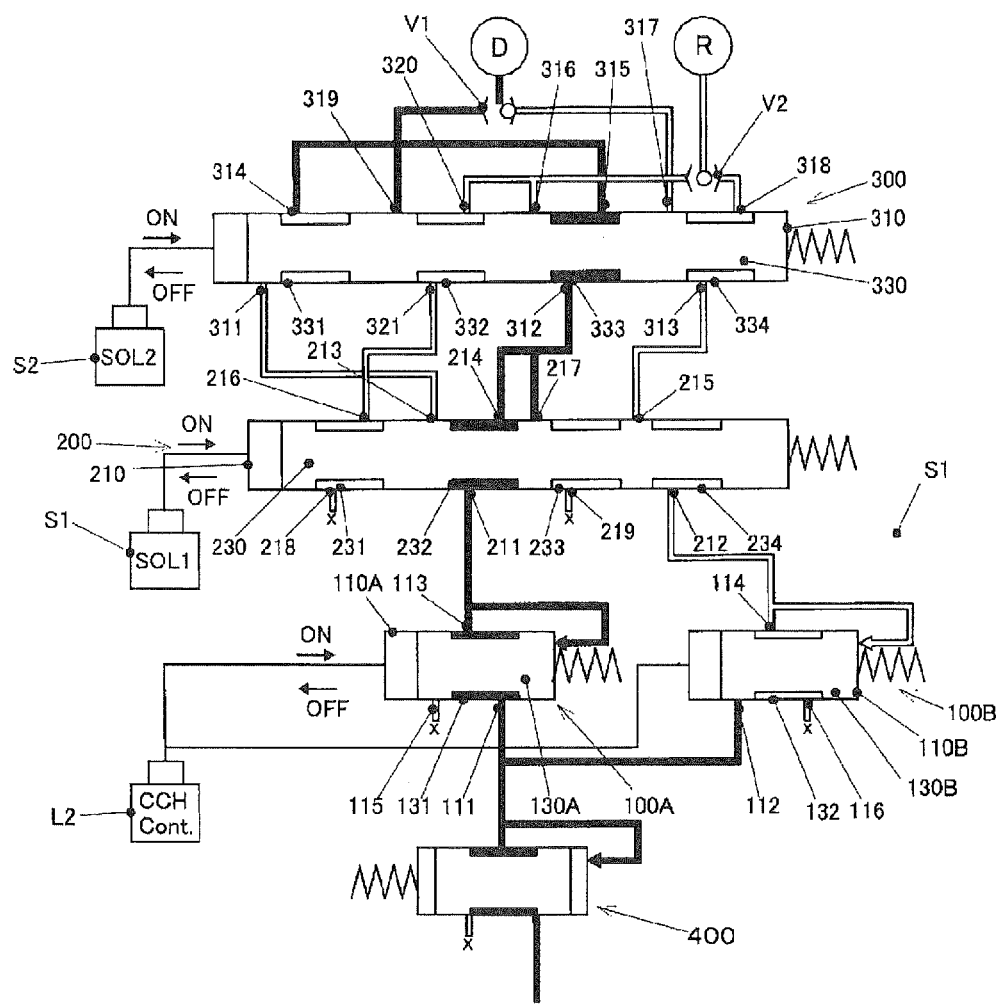
FIG. 11 is a schematic block diagram of a transmission control system including a range switching device of Embodiment 3 according to the present invention.

FIG. 11 shows a hydraulic circuit of the range switching device of Embodiment 3 and illustrates the D range in a normal state.

As shown in FIG. 11, in the range switching device of Embodiment 3, the side where an oil pressure is supplied from the spool valve 200 to the first DNR solenoid S1 and the side where the spring is provided are inverted with respect to those in Embodiment 2.

As a result, with respect to the spool valve 200, the relationship between the ON/OFF switching of the first DNR solenoid S1 and the state of the spool valve 200 has the characteristics opposite to those of Embodiment 1 and Embodiment 2.

Embodiment 3 can achieve an effect substantially identical to that of the above-described Embodiment 1 and Embodiment 2.

The spool valves 100 and 300 can be also configured to obtain such opposite characteristics.

[Modifications]

The present invention is not limited to the above-described examples and various changes and modifications are possible. Those changes and modifications are also included in the technical scope of the present invention.

(1) The range switching devices in the embodiments are provided, for example, at a continuously variable transmission (CVT), but the present invention may be also applied to transmissions of other types in which shifting between drive and reverse directions is performed by hydraulic engagement elements or fastening elements, such as a step AT using planetary gears.

(2) The shape, structure, and disposition of the elements constituting the range switching device are not limited to those of the embodiments and may be changed as appropriate. For example, the configuration of oil channels that communicate the ports of the spool valves and the disposition of the solenoid valves may be changed as appropriate.

What is claimed is:

1. A range switching device for performing switching among a drive range in which an oil pressure is transmitted to a forward driving element (D) of a transmission, a reverse range in which an oil pressure is transmitted to a reverse driving element (R), and a neutral range in which an oil pressure is substantially not transmitted to either of the forward driving element (D) and the reverse driving element (R), the range switching device comprising:
a first control valve driven by a first actuator and configured to control an oil pressure transmitted from an oil pressure supply source to a downstream;
a first switching valve driven by a second actuator and capable of selecting an oil channel for transmitting the oil pressure transmitted from the first control valve to the downstream;
a second switching valve driven by a third actuator and capable of transmitting the oil pressure transmitted from the first switching valve to either one of the forward driving element (D) and the reverse driving element (R);
a second control valve driven by the first actuator and capable of controlling the oil pressure from the oil pressure supply source to the downstream so as to deliver a characteristic opposite to that of the first control valve;
a third switching valve driven by the second actuator and capable of selecting an oil channel for transmitting the oil pressure transmitted from the second control valve to the downstream; and
a fourth switching valve driven by the third actuator and capable of transmitting the oil pressure transmitted from the third switching valve to either one of the forward driving element (D) and the reverse driving element (R),
wherein the first switching valve and the second switching valve can cooperatively switch to a state for transmitting the oil pressure transmitted from the first control valve to the forward driving element (D), a state for transmitting the oil pressure to the reverse driving element (R), and a state without transmitting of the oil pressure,
wherein the third switching valve and the fourth switching valve can cooperatively switch to a state for transmitting the oil pressure transmitted from the second control valve to the forward driving element (D), a state for transmitting the oil pressure to the reverse driving element (R), and a state without transmitting the oil pressure, and
wherein the third switching valve and the fourth switching valve each perform a substantially same oil pressure transmission when a state of the second actuator and a state of the third actuator are reversed with respect to the first switching valve and the second switching valve, respectively.

2. The range switching device according to claim 1, wherein the first switching valve and the third switching valve can be switched among running ranges including the drive range and the reverse range, and the neutral range; and
wherein the second switching valve and the fourth switching valve can be switched between the drive range and the reverse range.

3. The range switching device according to claim 2, wherein at least one of three pairs of the first control valve and the second control valve, the first switching valve and the third switching valve, and the second switching valve and the fourth switching valve is configured as a spool valve having a common spool.

4. The range switching device according to claim 2, wherein the first control valve transmits the oil pressure supply source to the downstream when the first actuator is in an ON state, and
wherein the second control valve transmits the oil pressure supply source to the downstream when the first actuator is in an OFF state.

5. The range switching device according to claim 2, further comprising:
a first shuttle valve for activating the forward driving element (D), the first shuttle valve including:
a first inlet that communicates with the first switching valve and the second switching valve; and
a second inlet valve that communicates with the third switching valve and the fourth switching valve.

6. The range switching device according to claim 2, further comprising:
   a first shuttle valve for activating the forward driving element (D); and
   a second shuttle valve for activating the reverse driving element (R), the second shuttle valve including:
      a first inlet that communicates with the first switching valve and the second switching valve; and
      a second inlet valve that communicates with the third switching valve and the fourth switching valve.

7. The range switching device according to claim 2, further comprising:
   a first shuttle valve for activating the forward driving element (D), the first shuttle valve including:
      a first inlet that communicates with the first switching valve and the second switching valve; and
      a second inlet valve that communicates with the third switching valve and the fourth switching valve; and
   a second shuttle valve for activating the reverse driving element (R), the second shuttle valve including:
      a first inlet that communicates with the first switching valve and the second switching valve; and
      a second inlet valve that communicates with the third switching valve and the fourth switching valve.

8. The range switching device according to claim 1, wherein at least one of three pairs of the first control valve and the second control valve, the first switching valve and the third switching valve, and the second switching valve and the fourth switching valve is configured as a spool valve having a common spool.

9. The range switching device according to claim 1, wherein the first control valve transmits the oil pressure supply source to the downstream when the first actuator is in an ON state, and wherein the second control valve transmits the oil pressure supply source to the downstream when the first actuator is in an OFF state.

10. The range switching device according to claim 1, further comprising:
   a first shuttle valve for activating the forward driving element (D), the first shuttle valve including:
      a first inlet that communicates with the first switching valve and the second switching valve; and
      a second inlet valve that communicates with the third switching valve and the fourth switching valve.

11. The range switching device according to claim 1, further comprising:
   a first shuttle valve for activating the forward driving element (D); and
   a second shuttle valve for activating the reverse driving element (R), the second shuttle valve including:
      a first inlet that communicates with the first switching valve and the second switching valve; and
      a second inlet valve that communicates with the third switching valve and the fourth switching valve.

12. The range switching device according to claim 1, further comprising:
   a first shuttle valve for activating the forward driving element (D), the first shuttle valve including:
      a first inlet that communicates with the first switching valve and the second switching valve; and
      a second inlet valve that communicates with the third switching valve and the fourth switching valve; and
   a second shuttle valve for activating the reverse driving element (R), the second shuttle valve including:
      a first inlet that communicates with the first switching valve and the second switching valve; and
      a second inlet valve that communicates with the third switching valve and the fourth switching valve.

\* \* \* \* \*